Jan. 21, 1947.  C. F. CALLAHAN  2,414,507
COTTON CHOPPER
Filed Sept. 4, 1945  3 Sheets-Sheet 2

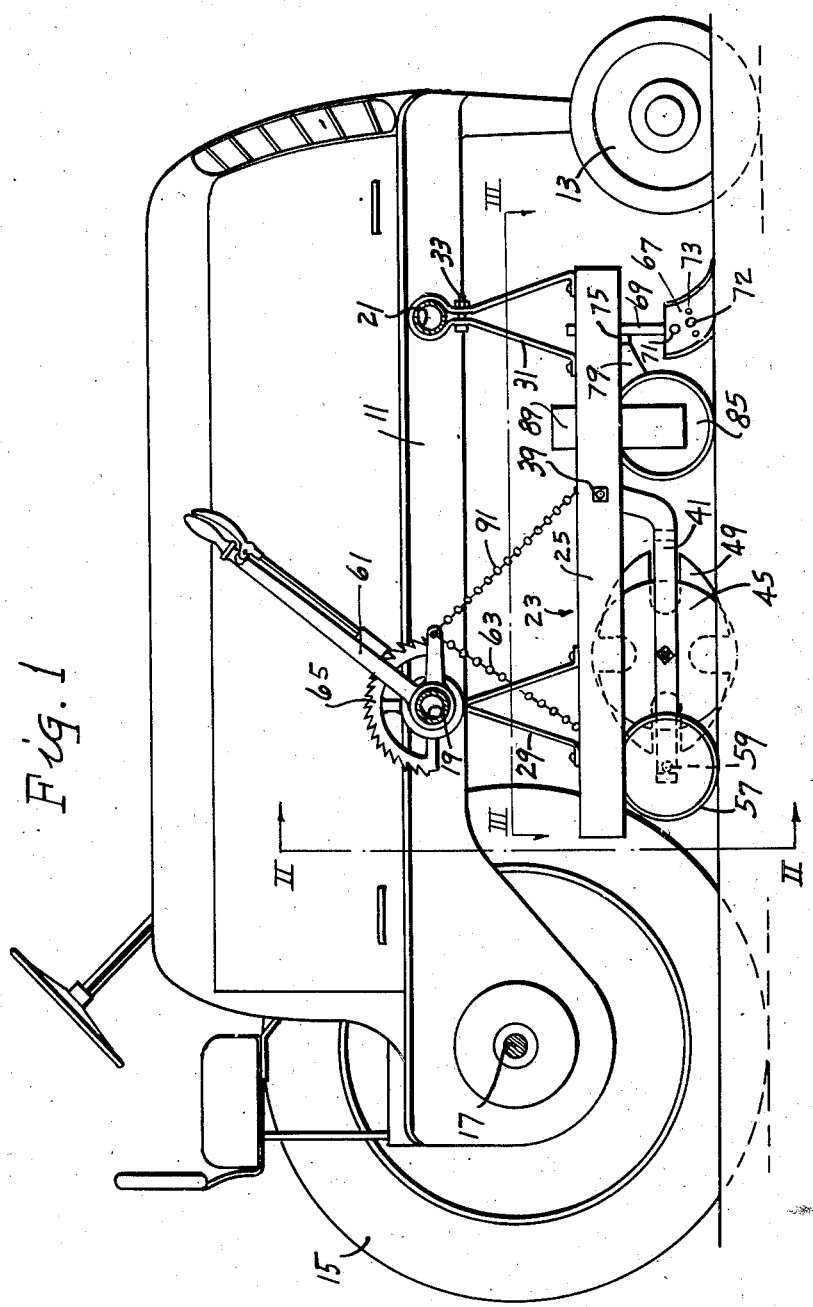

INVENTOR.
CHARLES F. CALLAHAN
BY J. H. Weatherford
ATTY

Jan. 21, 1947.  C. F. CALLAHAN  2,414,507
COTTON CHOPPER
Filed Sept. 4, 1945  3 Sheets-Sheet 3

INVENTOR.
CHARLES F. CALLAHAN
BY
J. H. Weatherford
ATTY

Patented Jan. 21, 1947

2,414,507

UNITED STATES PATENT OFFICE 2,414,507

COTTON CHOPPER

Charles Frederick Callahan, Memphis, Tenn.

Application September 4, 1945, Serial No. 614,398

12 Claims. (Cl. 97—12)

This invention relates to cotton choppers, and has especial reference to a chopper which is adapted to be carried by tractors of conventional type.

In raising cotton, the seed are planted in rows in which the cotton is closely spaced. When the cotton is some three to six inches high, intermediate plants are chopped out, together with grass and weeds, leaving hills spaced as nearly as possible uniform distances apart. This chopping is ordinarily done by hand labor and is very laborious, and many attempts have been made and devices are known for mechanically performing this operation.

The objects of the present invention are:

To provide a simple and efficient mechanism to clean off the grass along opposite sides of the row of plants and which will cut out intermediate plants leaving uniformly spaced hills, and at the same time will cultivate along the plant row.

A particular object of the invention is to provide a chopper which will perform these operations in a simple and efficient manner, which will be low enough in cost to permit its acquisition and ownership by the small farmer and which will be adapted to be secured to the tractor which is employed for various other uses, and which can be readily removed when it is desired to otherwise use the tractor and as readily replaced when chopping is to be done.

A further object is to provide chopping means in units which may be coupled in multiple and adjusted to the row spacing existing, and particularly to units which in pairs may be coupled to the "two rows" tractors now so universally employed.

The means by which the foregoing and other objects are accomplished, and the manner of their accomplishment, will readily be understood from the following specification, upon reference to the accompanying drawings, in which:

Fig. 1 is a side elevation outlining a typical tractor, with the wheel in the foreground removed, and the chopping mechanism supported from and carried thereby.

Figure 3:
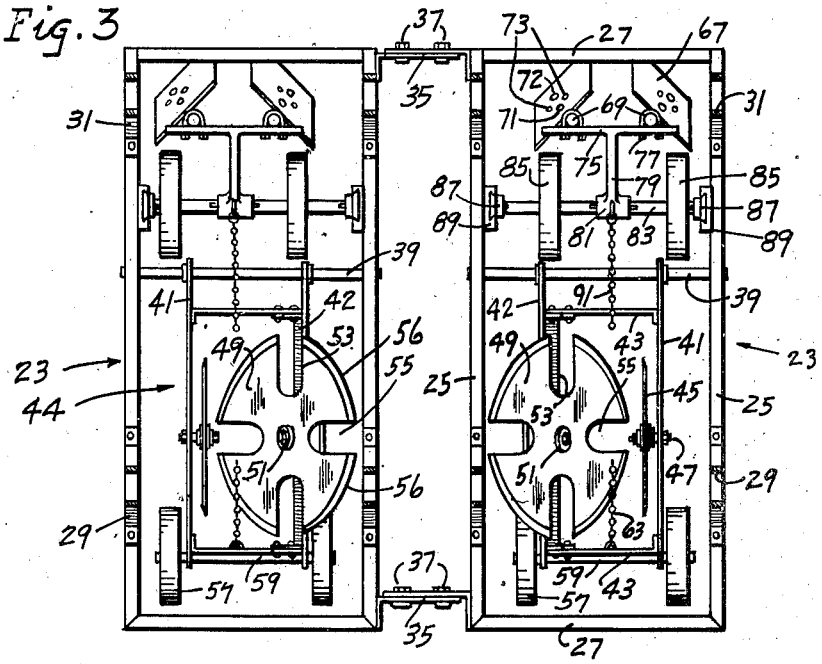
Fig. 3 is a plan taken as on the line III—III of Fig. 2 and of Fig. 1.
Figure 2:
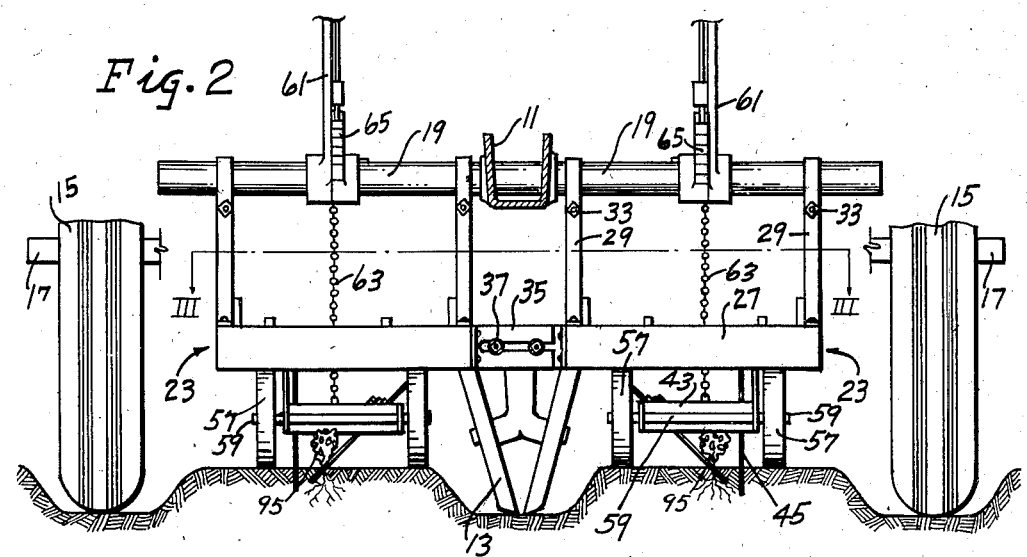
Fig. 2 is a sectional elevation taken as on the line II—II of Fig. 1, looking in the direction of the arrows.
Figure 4:
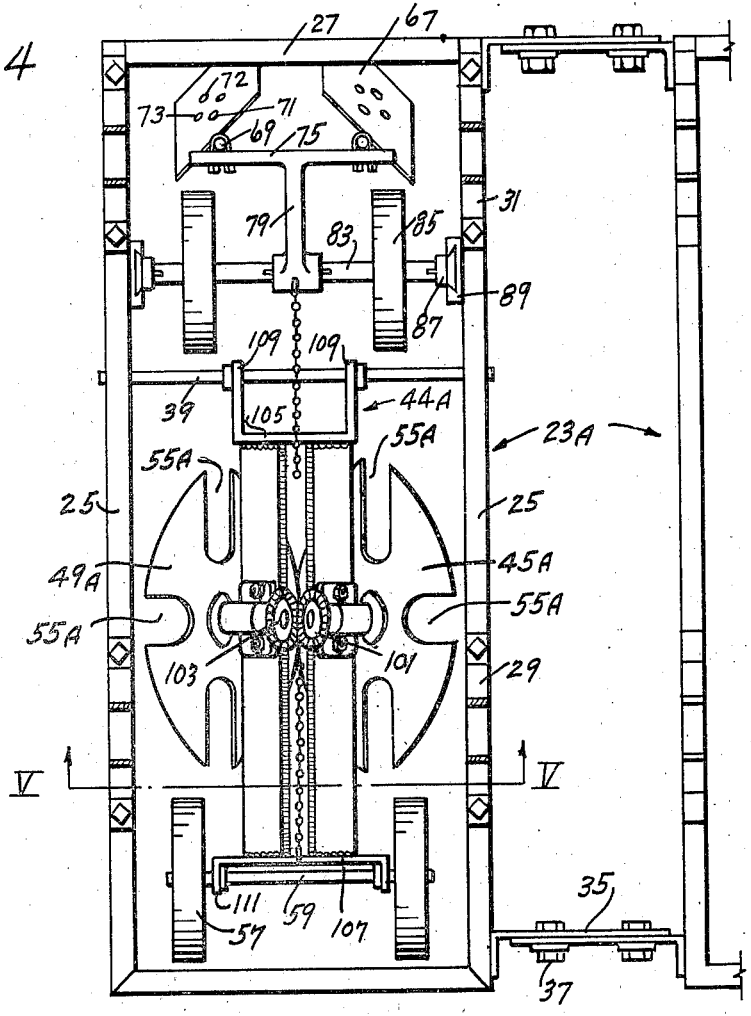
Fig. 4 is an enlarged plan showing a modified type chopping unit.
Figure 5:
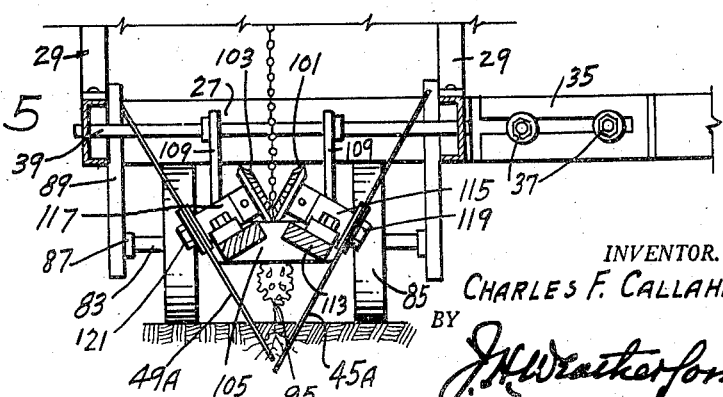

Fig. 5 a similarly enlarged sectional elevation on the line V—V of Fig. 4.

In these views, a two row tractor of conventional type is indicated and a pair of chopping units is shown carried by the tractor, and effective for chopping two rows at one time.

Referring now to the drawings in which the various parts are indicated by numerals:

11 is a central frame of a tractor having a pair of closely spaced front wheels 13 adapted to run in the furrow between two rows and widely spaced rear wheels 15, which, in the well known manner of such tractors, are adjustable inward or outward along a rear axle 17 to conform to the spacing of the adjacent furrows lying on the outer side of these rows.

The tractor is equipped in usual manner with arms 19 and 21 which project outward oppositely from the central frame for the support of the varied cultivating units which may be carried thereby, these arms being used to support the present chopping units, of which there are two, which are shown as spaced to conform to the least row spacing possible for the present mechanism and as adjustable to wider row spacings.

The present mechanism comprises units 23, each of which has a frame, comprising a pair of side members 25, which may be channel irons, rigidly connected at their ends by end members 27, which frame is supported from the arms 19 and 21 on one side of the tractor by depending hangers 29 and 31, these hangers being adjustable inward or outward along the arms 19 and 21 to position the units with regard to the rows, and clamped in adjusted position by bolts 33. Preferably the two units 23 are connected adjacent their forward and rear ends by adjustable braces 35 which are similarly clamped in adjusted position by bolts 37.

Disposed transversely across between the side members 25 of each unit is a shaft 39 which supports the forward ends of a pair of side bars 41 and 42, the bars extending downward and thence being bent to extend substantially horizontally rearward. The bars are connected and rigidly braced adjacent their forward and rear ends by cross bars 43 to form a rigid disc-carrier or cradle 44.

Mounted in this cradle is a vertically disposed stabilizing disc 45 having a knife edge, which disc is suitably journalled on a stud shaft or stud 47 rigidly projecting inward from the side bar 41.

Also disposed within the cradle is an inclined chopping disc 49, also having a knife edge, which is journalled on a stud 51, secured to and projecting from the opposite side bar 42 of the cradle, the bar preferably having the same inclination as the disc. The disc 49 is deeply notched at uniform intervals around its periphery to form plant receiving recesses 55 which are spaced apart center to center around the edge of the disc at distances equal to the desired hill spacing of the cotton which is to be left.

In the present instance, the disc 49 has a circumference equal to four desired hill spacings and four of such notches 55, the disc edge sectors 56 between the notches representing the area to be cleared or chopped between the retained hills.

At the rear end of the cradle are wheels 57 journalled on a cross shaft 59, which wheels roll along the ground adjacent the row of plants and support the rear end of the cradle.

Mounted on the arms 19 are bell crank levers 61 which are respectively connected through chains 63 to the rear end bars 43 of the cradles for raising the cradles during transportation from place to place. 65 are ratchet quadrants cooperating with the arms 61.

Adjacent the forward end of each unit 23 is a scraper assembly which includes a pair of scraper blades 67, each having a vertically disposed shank, to which the blade is secured in usual manner, as by plow bolts 71 and 72. Preferably the blades are provided with additional holes 73, with either of which the bolt 72 may be engaged to shift the angle of the blade with respect to the shank 69. The blade shanks 69 extend upward and are secured to a cross bar 75, as by U-bolts 77. Integrally secured to and extending rearwardly and downwardly from the bar 75 is a second bar 79 which terminates in a sleeve 81 which is keyed to a cross shaft 83, on which are journalled wheels 85. The ends of the shaft 83 are keyed to blocks 87 which are slidably disposed in vertical guides 89 rigidly secured to the side members 25, the wheels 85 being adapted to ride along the ground adjacent the row of plants, and rearwardly of the blades 67 and support the blades in cutting position.

91 are chains connected between the sleeves 81 and the bell crank levers 61 for raising the scraper assembly concurrently with raising of the discs during shift, as of the equipment from field to field, or otherwise when desired. Normally the chains 63 and 91 do not support either the scraper units or the chopping unit during operation, though they are ordinarily set to prevent excessive drop of either where abnormal conditions arise during use.

The units may carry shields which cover the discs and other parts of the units, but these have been purposely omitted in order that a clearer showing of the working parts may be made.

It will be understood that much of the construction detail may be varied without departing from the underlying principles of the machine.

In the modified type, shown in Figs. 4 and 5, units 23A are shown which are of substantial identity to those already described, except that the two chopping discs 45A and 49A are both inclined to the vertical and are both provided with plant receiving recesses 55A, the cradle 44A which carries these discs being modified to accomplish the blade inclination. The discs are compelled to turn at equal rotative speeds by meshing beveled gears 101, 103, the remaining portions of the units being substantially unchanged and being designated by the numbers heretofore used.

The modified cradles include end members 105, 107, the end member 105 having forwardly and upwardly extending arm portions 109 carried at their forward upper ends by the shaft 39, and the member 107, rearwardly extending lugs 111 which carry the cross shaft 59 on which the wheels 57 are journalled. Between the end members are longitudinal bars 113 inclined in cross section at right angles to the discs, which bars carry bearings 115, 117. The discs 45A and 49A are respectively rigidly secured to shafts 119, 121, which are journalled in the bearings 115, 117 and carry on their opposite ends the meshing gears 101 and 103, similarly secured.

One of the discs, as the disc 45A, is preferably slightly larger than the other disc 49A, and the discs are so mounted that the larger disc 45A extends below and at its lower edge slightly underlies the disc 49A.

It will be understood also that the bell crank levers and quadrants are here shown as mounted on the arms 19. Most tractors, however, are equipped with such levers independently supported and adapted for use in substantially the same manner as though mounted on these arms. Such tractors may be equipped with present apparatus by merely slipping the hangers 29 and 31 over the ends of the arms 19 and 21 and shifting them to place and securing them by clamping the nuts 33. In the present showing it is also necessary in doing this to place the bell crank arms and quadrants on the arms 19 and clamp or key the quadrants in place.

After installing the hangers, they are laterally adjusted to space the two units 23 to conform to the spacing of the rows with which the choppers are to be used, this spacing under present cotton planting practice being between thirty-six and forty-two inches. After this adjustment, the clamping bolts 33 are tightened and the bolts 37 tightened to complete rigid coupling of the units.

In operation, the tractor is driven along the rows with the front wheels 13 in the furrow between two rows and the rear wheels 15 in the furrows on either side thereof. The bell crank levers 61 are shifted to release the chains 63 and 91 and allow the scraping and chopping units to rest on and be supported by the tops of the rows. As the tractor advances along the rows, the scrapers 67 clean off the grass and dirt on either side of the rows of plants 95 and the stabilizing discs 45 roll along and cut downward into the rows at one side of the plants, the inclined discs 49 rolling along, with the sectors 56, cutting away the grass and plants and cutting into the rows between the hills which are to be left, the cuts beginning forwardly of the centers of the discs, and as the discs are advanced, the notches 55 embracing those plants which are to be left to form the hills, and rearwardly retracting, leaving the undisturbed hills, with the cutting edge also moving away from the row. In these actions the stabilizing discs 45 prevent lateral displacement of the dirt in the row.

In the modified type shown in Figs. 4 and 5, substantially the same chopping and cleaning actions take place, except that both discs of each unit being recessed it is not necessary to follow the line of plants in the rows so exactly, and control of the operations is easier. It will be understood that one of the primary objects of the device is to provide cutting discs so inclined that they will penetrate the surface of the ground or row being cultivated and will accomplish cut-off of weeds and plants below the surface. In the drawings the angular relation of the discs to each other is shown as of the nature of forty-five to sixty degrees, with a minimum disc inclination to the horizontal of forty-five degrees, giving a readily apparent illustration of the surface penetration and sub-surface cut-off accomplished by the discs. The illustrated angularity is preferable because of its inherent efficiency insofar as penetration is concerned, but it will be appreciated that a relation of much greater angularity may be established employing the principles of this invention and yet accomplish subsurface cut-off of weeds and plants. Such an enlarged angularity tends to broaden the cut-off path and lessen penetration, but will be seen and understood to fall directly within the scope of the present invention when employable to penetrate and accomplish subsurface cut-off.

The amount by which the angularity may be increased within the scope of the invention, however, is limited by the very use for which the discs are designed, and it will be seen that an angular relation substantially in excess of one hundred twenty degrees will be beyond the useful limit of disc inclination to accomplish surface penetration. It will, therefore, be understood that reference herein to the relative angularity of the discs is intended to include, except where specifically otherwise stated, a range of useful inclination of which the maximum is a relative angularity of the nature of one hundred twenty degrees.

I claim:

1. In a cotton chopper, a scraping and chopping unit, and means carrying said unit and propelling it along a row of plants, said unit including a frame supported from said propelling means, a wheel supported carrier adjacent the forward end of said frame, vertically shiftable means coupling said carrier to said frame, and scraper blades secured to said carrier and spaced to lie on opposite sides of said row; a cradle hingedly secured at its forward end to said frame rearward of said carrier, wheels journalled on and supporting the rear end of said cradle, and a pair of chopping discs journalled on said cradle and converging into adjacency along said row and below the surface of said row, at least one of said discs being inclined to the vertical and having a circumference equalling a plurality of desired hill spacings and being cut away inwardly from its periphery at the same plurality of spacings to form recesses each having a width equal to the desired length of hill.

2. A cotton chopper in accordance with claim 1, which includes two units and means adjustably spacing and bracing the frames thereof to aline the scraper blades and discs with parallel rows.

3. In a cotton chopper, a chopping unit including a cradle, means for carrying and propelling said unit along a row of plants, means hingedly supporting the forward end of said cradle from said carrying means, supporting wheels journalled adjacent the rear end of said cradle, a pair of sharpened discs journalled in said cradle and converging downwardly at substantially equal inclinations, one of said discs being slightly larger than the other, and the smaller disc extending into adjacency with the proximate face of the larger, below the surface of the ground adjacent said row, one of said discs having a circumference substantially equalling a plurality of desired hill spacings, said discs being cut away radially inward from their peripheries at the same plurality of uniform intervals to provide recesses with circumferential cutting sectors therebetween, said recesses being of width to leave undisturbed plant hills of desired length, and means including meshing gears respectively rigidly secured to said discs compelling synchronous rotation of said discs and register of said recesses.

4. In a cotton chopper, a chopping unit including a cradle, means for carrying and propelling said unit along a row of plants, means hingedly supporting the forward end of said cradle from said carrying means, supporting wheels journalled adjacent the rear end of said cradle, a pair of sharpened discs, one of said discs having a circumference substantially equalling a plurality of desired hill spacings, a first of said discs being cut away radially inward from its periphery at the same plurality of intervals to provide recesses with circumferential cutting sectors therebetween, said recesses being of width to leave undisturbed plant hills of desired length, means journalling said discs to said cradle, a first said journalling means being positioned to incline said first disc to said cradle and project its lower edge below the surface of said row and across the line of said plants, and the second said journalling means being positioned to maintain the second said disc in substantially upright position and project its lower edge below the lower edge of said first disc and in adjacency therewith.

5. A machine as for chopping cotton, which includes a pair of sharpened discs, and means for journalling, supporting and propelling said discs along a row of plants in penetrating relation with said row, one of said discs being substantially vertically disposed and the other said disc being deeply notched inward from its edge at equally spaced intervals and converged downwardly into edge adjacency with the proximate face of said vertically disposed disc adjacent the lower edge of the latter said disc, below said row surface, and being deeply notched inward from its edge at equal intervals.

6. A machine for chopping cotton or the like, including two discs with sharpened cutting edges, mounted for rotation about axes which downwardly converge said discs at ground penetrating angles, to the horizontal, into cutting edge adjacency, at least one of said discs being inclined to the vertical and having peripheral plant receiving notches equi-angularly spaced, means for propelling said discs along a row of plants, and means for positioning the discs with respect to the ground so that their lower edges penetrate the ground to effect cutting action below the surface thereof; in which the plane containing the axes of rotation of said discs is substantially vertical and at right angles to the line of propelling movement, said discs are flat to maintain converging angularity to the edges thereof and cooperation with the positioning of said axes to promote ground penetration and minimize ground displacing action.

7. A machine for chopping cotton or the like, including two discs with sharpened cutting edges, mounted for rotation about axes which downwardly converge said discs at ground penetrating angles to the horizontal, into cutting edge adjacency, said discs having complementary peripheral notches equi-angularly spaced and arranged to register to form plant receiving openings, means for compelling equal turning movements of said discs and maintaining register of said openings, means for propelling said discs along a row of plants, and means for positioning the discs with respect to the ground so that their lower edges penetrate the ground to effect cutting action below the surface thereof; in which the plane containing the axes of rotation of said discs is substantially vertical and at right angles to the line of propelling movement, said discs are flat to maintain converging angularity to the edges thereof and to cooperate with the positioning of said axes to promote ground penetration and minimize ground displacing action.

8. In a chopper as for cotton, a pair of chopping units and means carrying said units and propelling them along parallel rows of plants, said units each including a frame supported from, and laterally adjustable with relation to, said propelling means; means for adjustably spacing and bracing said units to aline said disc pairs with the plants of said rows, each said unit including a cradle hingedly secured at its forward end to said frame, wheels journalled on and supporting the rear end of said cradle, said discs having sharpened edges and being journalled on said cradle to converge their lower portions downwardly at substantial ground penetrating angularity to the horizontal and into cooperative cutting edge adjacency along said rows below the surface thereof, at least one of said discs being inclined to the vertical and having a circumference equalling a plurality of desired hill spacings and being cut away inwardly from its periphery at the same plurality of spacings to form recesses, each having a width equal to the desired length of hill.

9. In a chopper as for cotton, a pair of chopping units, and means carrying said units and propelling them along parallel rows of plants, said units each including a pair of discs and a frame supported from, and laterally adjustable with relation to, said propelling means; means for adjustably spacing and bracing said units to aline said disc pairs with the plants of said rows, each said unit including cradle-carried ground-engaging means supporting the rear end of said cradle, said discs having sharpened edges and being journalled on said cradle and converging downwardly at substantial ground penetrating inclinations to the horizontal into cutting adjacency along said row below the surface thereof, said discs having complementary peripheral recesses, equi-angularly spaced and arranged to register to form openings each having a width equal to the desired length of hill, and means including meshing gears compelling equal rotational speed of said discs and maintaining register of said openings.

10. In a cotton chopper, a chopping unit including a cradle, means for carrying and propelling said unit along a row of plants, means hingedly supporting the forward end of said cradle from said carrying means, supporting wheels journalled adjacent the rear end of said cradle, a pair of sharpened discs journalled in said cradle about downwardly flaring axes which converge said discs downwardly, each at a substantial ground-penetrating inclination to the horizontal, into edge adjacency below the surface of the ground adjacent said row, at least one of said discs having a circumference equalling a plurality of desired hill spacings, said discs being cut away radially inward from their peripheries at the same plurality of uniform intervals to provide recesses with circumferential cutting sectors therebetween, said recesses being of width to leave undisturbed plant hills of desired length, and means respectively rigidly secured to said discs compelling synchronous rotation of said discs and register of said recesses, in which said discs are flat and said axes lie in a substantially vertical plane at right angles to the line of propelling movement, to minimize ground displacing action of said discs.

11. A machine for chopping cotton or the like, including two flat discs with sharpened cutting edges, mounted for rotation about downwardly flaring axes with the lower edge of a first said disc above the lower edge of the second said disc and said first disc extending angularly with respect to said second disc, substantially into peripheral cutting edge contact against the face of said second disc, at least said first disc being inclined to the vertical, and having peripheral plant receiving notches equiangularly spaced, means for positioning the discs with respect to the ground so that their lower edges penetrate the ground to effect cutting action below the surface thereof, and means for propelling said discs along a row of plants, the plane containing the axes of rotation of said discs being substantially vertical and at right angles to the line of propelling movement to minimize ground displacing action of said discs.

12. A machine for chopping cotton or the like, including two flat discs with sharpened cutting edges, mounted for rotation about downwardly flaring axes with the lower edge of a first said disc above the lower edge of the second said disc, and said first disc extending angularly with respect to said second disc, substantially into peripheral cutting edge contact against the face of said second disc, said discs having complementary peripheral notches equi-angularly spaced and arranged to register to form openings, means for compelling equal turning movements of said discs and maintaining register of said openings, means for propelling said discs along a row of plants, and means for positioning the discs with respect to the ground so that their lower edges penetrate the ground to effect cutting action below the surface thereof, the plane containing the axes of rotation of said discs being substantially vertical and at right angles to the line of propelling movement to minimize ground displacing action of said discs.

CHARLES FREDERICK CALLAHAN.